United States Patent
Ho

(10) Patent No.: US 7,440,128 B2
(45) Date of Patent: Oct. 21, 2008

(54) PRINT DATA COMPRESSING METHOD

(75) Inventor: Wen-Cheng Ho, Shigang Shiang (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 918 days.

(21) Appl. No.: 10/992,847

(22) Filed: Nov. 22, 2004

(65) Prior Publication Data

US 2005/0270562 A1 Dec. 8, 2005

(30) Foreign Application Priority Data

May 18, 2004 (TW) ............................. 93113999 A

(51) Int. Cl.
*G06F 15/00* (2006.01)
*G06K 15/00* (2006.01)
(52) U.S. Cl. ..................... 358/1.15; 358/539
(58) Field of Classification Search .............. 358/1.1, 358/1.9, 1.15, 539, 426.04, 426.05, 426.16; 382/232, 234, 236, 239
See application file for complete search history.

(56) References Cited

U.S. PATENT DOCUMENTS

| 5,923,820 | A | * | 7/1999 | Cunnagin et al. | ............ 358/1.8 |
| 5,930,466 | A | * | 7/1999 | Rademacher | ............ 358/1.15 |
| 7,289,243 | B2 | * | 10/2007 | Fagan | ............ 358/1.8 |
| 2004/0032598 | A1 | * | 2/2004 | Fagan | ............ 358/1.8 |

* cited by examiner

*Primary Examiner*—Gabriel I Garcia
(74) *Attorney, Agent, or Firm*—Bacon & Thomas, PLLC

(57) ABSTRACT

A print data method includes a slicing step, a compressing step and decompressing step. The slicing step divides a swatch of data to be printed and required by each motor movement into a plurality of slices, each having m bits to represent printed pixels and further divided into n segments, where m, n are integers. The compressing step uses an inter-slice compression to represent an (i+1)-th slice of data on a basis of an i-th slice of data for generating a compressed (i+1)-th slice of data and an (i+1)-th control character. The decompressing step uses an inter-slice decompression with respect to the inter-slice compression to restore the (i+1)-th slice of data from the compressed (i+1)-th slice of data for further printing.

13 Claims, 6 Drawing Sheets

PRINT DATA COMPRESSING METHOD

BACKGROUND OF THE INVENTION

1. Field of the Invention

The invention relates to a data compression method and, more particularly, to a print data compressing method suitable for a printer.

2. Description of Related Art

Typical In-Line technologies firstly process print data through a host and then the host sends the processed data to a printer for printing, which only performs motor movement and ink spraying operations at this point. However, the amount of print data increases more and more as increasing print resolution. For example, for a 600 dpi (dot per inch) resolution, required data amount for printing on an A4 paper is 600 (dpi)×8 (inch)×600 (dpi)×11 (inch)/8=3.96 Mbytes. Accordingly, print data must be compressed and subsequently sent to the printer, thereby reducing data transmission amount between the host and the printer. A conventional method applies PCL algorithm to an image file to be printed for first compression and then transmission to a printer to interpret and final print. However, such a method requires more complicated hardware to interpret the PLC data.

To overcome this, U.S. Pat. No. 5,930,466 uses the features of an image file to be printed to compress the transmitting image file. This is achieved by defining a compressed unit as required print data by all nozzles on a printhead. For example, there are 192 nozzles on the printhead and accordingly required print data is 192 bits, which form a slice, or 192/8=24 segments.

Each slice can be compressed by two ways. First way is shown in FIG. 1, which uses a feature of no ink ejection on blank regions in a picture frame to thus achieve data compression purpose. In this case, a segment of data with "0" is deleted and represented by a 1-bit status flag. Namely, when the 1-bit status flag is "1", it indicates a corresponding segment of data with "0"; conversely, when the 1-bit flag is "0", it indicates that a corresponding segment of data is not compressed. In FIG. 1, after an uncompressed data such as {10111111, 00000000, 00000000, 11100111, . . . } is compressed, corresponding second and third bits of the status flag are "1" respectively to indicate the second and the third segments of data with "0", thereby reducing data amount. An optimal situation is that a 24-byte data can be recorded by only 24 bits for a slice of data with 0. However, such a way can obtain effective compression only for a segment of data with "00000000".

Second way is shown in FIG. 2, wherein when a segment of data is not recorded when it has the same data as a previous segment of data. Namely, if the status flag is "1", it indicates that the corresponding segment has the same data as a previous segment and, conversely, it indicates that the corresponding segment of data is not compressed. In FIG. 2, for an uncompressed data such as {10101010, 10101010, 10101010, 11100111, . . . }, the first to third segments have the same data so that after compressed, corresponding second and third bits of the status flag are "1" to indicate the second and the third segments having the same data as the first segment. Thus, the data transmission amount is decreased. Likely, an optimal situation is that all segments of a slice have the same data so that a 24-byte data can be recorded by only 4 bytes (24bits+1byte). However, such a way can obtain effective compression only for a slice with a single data pattern. For a slice with two or more data patterns, only one of the data patterns can be compressed and the other cannot.

Therefore, such a way cannot have satisfactory compression efficiency even through it can overcome the cited complicated hardware.

Therefore, it is desirable to provide an improved method to mitigate and/or obviate the aforementioned problems.

SUMMARY OF THE INVENTION

The object of the invention is to provide a print data compressing method, which can have satisfactory compression efficiency.

In accordance with one aspect of the present invention, there is provided a print data compressing method. The method includes a slicing step, a compressing step and decompressing step. The slicing step divides a swatch of data to be printed and required by each motor movement into plural slices of data, each slice having m bits to represent printed pixels and being divided into n segments of data, where m, n are integers. The compressing step uses an inter-slice compression to represent a $(x+1)$-th slice of data on a basis of a x-th slice of data for generating a compressed $(x+1)$-th slice of data and a $(x+1)$-th control character. The decompressing step uses an inter-slice decompression with respect to the inter-slice compression to restore the $(x+1)$-th slice of data from the compressed $(x+1)$-th slice of data for further printing.

In accordance with another aspect of the invention, there is provided a print data compressing method. An j-th segment of a slice is represented by one of pre-stored k segments of data patterns. The method includes a slicing step, a compressing step and decompressing step. The slicing step divides a swatch of data to be printed and required by each motor movement into plural slices of data, each slice having m bits to represent printed pixels and being divided into n segments, where m, n are integers. The compressing step uses an intra-slice compression to represent data of an j-th segment of a x-th slice by an k-th segment of data pattern for generating a compressed x-th slice of data and a x-th control character. The decompressing step uses an intra-slice decompression with respect to the intra-slice compression to restore the x-th slice of data from the compressed x-th slice of data for further printing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
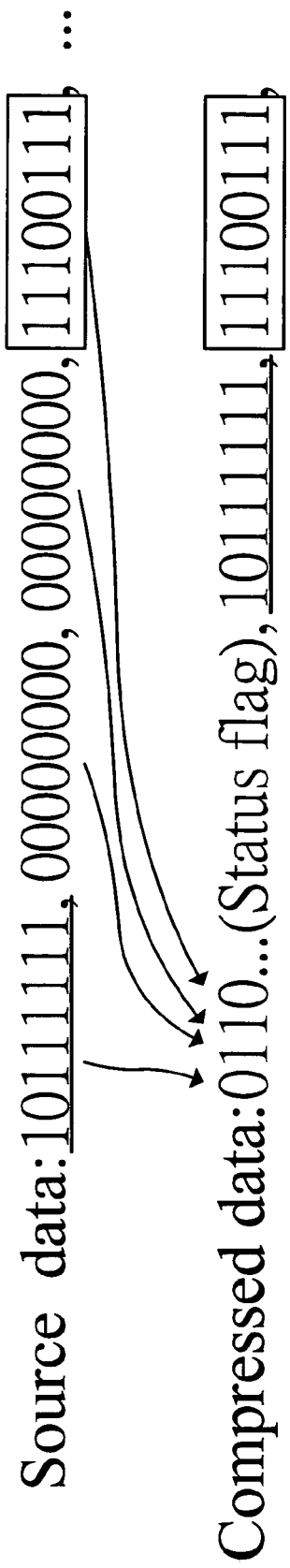
FIG. 1 is a schematic drawing of a conventional print data compressing method.
Figure 2:
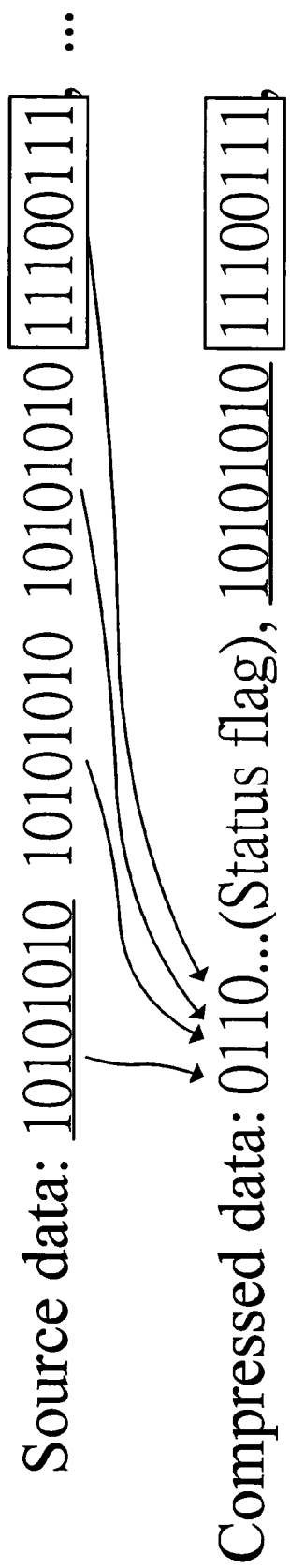
FIG. 2 is a schematic drawing of another conventional print data compressing method.
Figure 3:
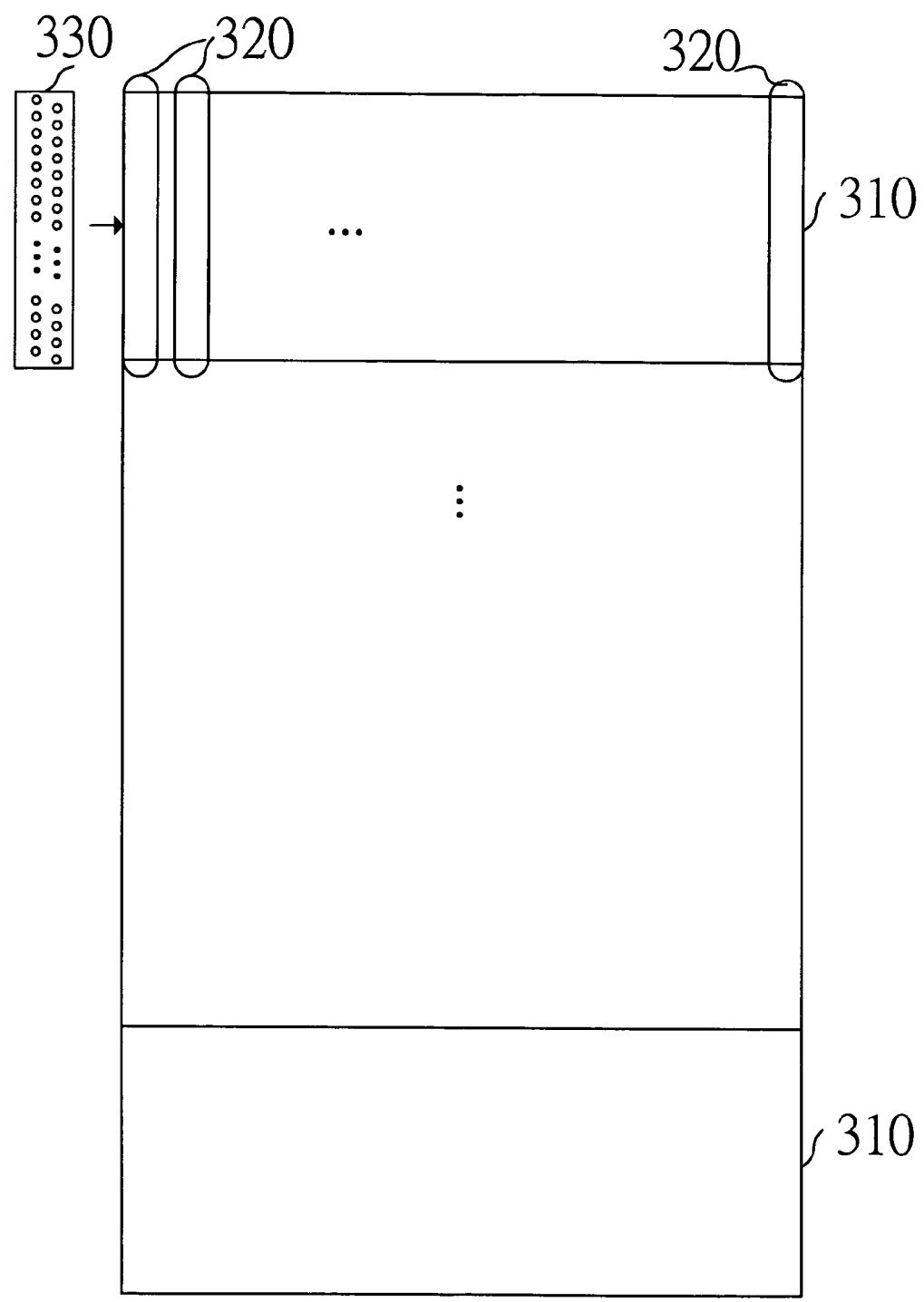
FIG. 3 is a schematic view of a typical A4 size of print data.

With reference to FIG. 3, there is shown a schematic view of printing a given A4 size of print data for description. The A4 size of print data can be divided into a plurality of swatches 310, each swatch 310 having a plurality of slices 320, each slice 320 further having m bits to represent printed pixels, wherein m indicates a number of nozzles of printhead 330. Each slice is further divided into n segments, each segment having 8M bits, wherein n and M are positive integers.

Figure 4:
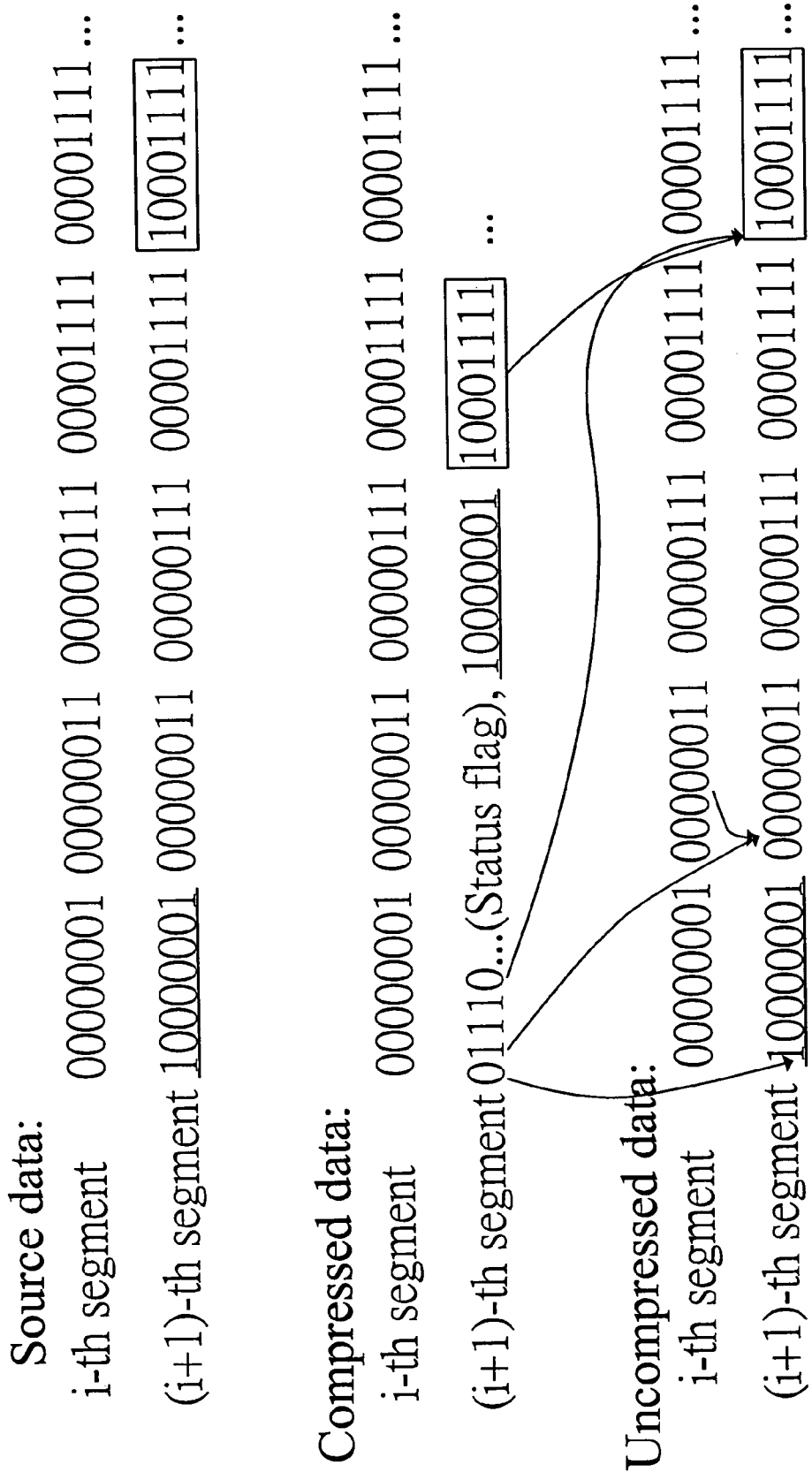
FIG. 4 is a schematic view of an embodiment of a print data compressing method in accordance with the invention.

FIG. 4 is a schematic view of an embodiment of a print data compressing method in accordance with the invention. As shown, if j-th segment of (x+1)-th slice has the same data as j-th segment of x-th slice, the j-th segment of print data in the (x+1)-th slice is not recorded and j-th bit of a status flag is set as "1" to represent having the same data in both j-th segments of the x-th and (x+1)-th slices. If j-th bit of a status flag is "0", it indicates data of the j-th segment of (x+1)-th slice different from that of x-th slice.

For convenience, this embodiment is given by a printer with a printhead having 192 nozzles. In this case, one slice 320 has 192 bits to represent printed pixels, or 24 (192/8) segments in a unit of byte. In FIG. 4, if a source data in a x-th slice to be printed is as {00000001, 00000011, 00000111, 00001111, . . .}, a (x+1)-th slice of data as {10000001, 00000011, 00000111, 00001111, . . . }, when compressing the x-th and the (x+1)-th slices, it is obvious that same contents appear on second, third and fourth segments of the x-th and the (x+1)-th slices. Thus, second, third and fourth bits of a flag are set to "1" to represent the same contents and also the second, the third and the fourth segments are omitted and not added to a content of compressed data for the (x+1)-th slice. In addition, since first and fifth segments of the x-th and the (x+1)-th slices have different contents, first and fifth bits of the flag are set to "0", and the first and the fifth segments of the (x+1)-th slice are recorded after the flag.

The compressed data is then sent from a host to a printer. Thus, the printer can obtain the (x+1)-th slice of data after decompression in accordance with the x-th slice of data and the flag and the compressed data for the (x+1)-th slice. In this case, the first bit of the flag is "0", which indicates that the first segment is not omitted but follows the flag. The second, the third and the fourth bits of the flag are "1", which indicates that the second, the third and the fourth segments are omitted due to the same contents as those of the x-th slice, thus the aforementioned segments are copied from the x-th slice to the (x+1)-th slice in place. The fifth bit of the flag is "0", which indicates that the fifth segment is not omitted but follows the first segment or located at the second segment after the flag.

Such a compression, which keeps the different contents and omits the same contents in the (x+1)-th slice on a basis of the x-th slice, can have relative effects on lines or shape-fixed patterns.

Figure 5:
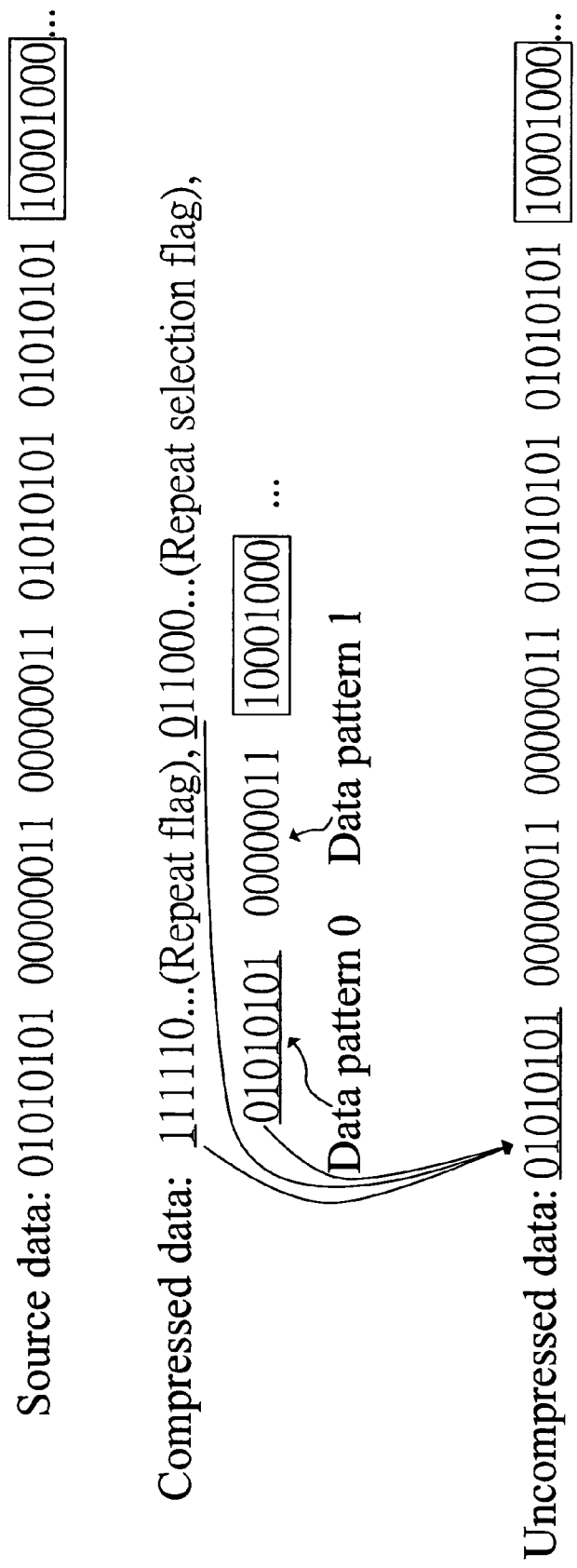
FIG. 5 is a schematic view of another embodiment of a print data compressing method in accordance with the invention.

FIG. 5 is a schematic view of another embodiment of a print data compressing method in accordance with the invention, which is an intra-slice compression. If a k-th segment of a slice has a same content as an i-th segment of the slice, the intra-slice compression is achieved by omitting the k-th segment of data, setting k-th bit of a repeat flag to "1" to indicate that the k-th segment is omitted, and setting k-th bit of a repeat selection flag to "1" to indicate that the k-th and the i-th segments have the same content. If the k-th segment is identical to an j-th segment of the slice, the intra-slice compression is achieved by omitting the k-th segment, setting k-th bit of the repeat flag to "1" to indicate that the k-th segment is omitted, and setting k-th bit of the repeat selection flag to "0" to indicate that the k-th and the j-th segments have the same content.

In FIG. 5, a source data to be printed has a x-th slice of data as {01010101, 00000011, 00000011, 01010101, 01010101, 10001000, . . . }. If the first and the second segments of data in the x-th slice are regarded as data patterns 0 and 1, when compressing the x-th slice, first and second bits of the repeat flag are set to "1", and first and second bits of the repeat selection flag are set to "0" and "1" to indicate using the data patterns 0 and 1 respectively. Since the data patterns 0 and 1 are not defined, the first and the second segments are added after the repeat selection flag for provision of the data patterns 0 and 1. When the i-th bit of the repeat flag is "1", it indicates that an i-th segment of a slice in a compressed data is omitted. When the i-th bit of the repeat flag is "0", it indicates that the i-th segment of the slice in the compressed data is saved completely. When the i-th bit of the repeat selection flag is "1", it indicates that the i-th segment of the slice has a content the same as the data pattern 1. When the i-th bit of the repeat selection flag is "0", it indicates that the content of the i-th segment of the slice is same as the data pattern 0. For decompressing, when the i-th bit of the repeat flag is "0", it indicates that the i-th segment of the slice in the compressed data is saved completely, thus the i-th bit of the repeat selection flag is not referred.

The aforementioned method is based on that the first and the second segments are regarded as data patterns 0 and 1 respectively. Alternately, based on the statistics, the highest two probabilities of segments appearing on the i-th slice can be regarded as the data patterns 0 and 1.

Referring again to FIG. 5, since the third segment is identical to the data pattern 1, the third bit of the repeat flag is set to "1", the third bit of the repeat selection flag is set to "1", and the third segment is omitted. Since the fourth and the fifth segments are identical to the data pattern 0, the fourth and the fifth bits of the repeat flag are set to "1" respectively, the fourth and the fifth bits of the repeat selection flag are set to "0" respectively, and the fourth and the fifth segments are omitted. Since the sixth segment has a content different from the data patterns 0 and 1, the sixth bit of the repeat flag is set to "0", the sixth bit of the repeat selection flag is set to "0", the sixth segment is added after the data pattern 1. Thus, a compressed data is formed.

The compressed data is sent from a host to a printer. Thus, the printer can obtain the x-th slice of data after decompression based on the repeat flag, the repeat selection flag, the data pattern 0, the data pattern 1 and the non-omitted data. In this case, the first bit of the repeat flag is "1", which indicates that the first segment is omitted, and the first bit of the repeat selection flag is "0", which indicates that the first segment can be restored by copying the data pattern 0. The second bit of the repeat flag is "1", which indicates that the second segment is omitted, and the second bit of the repeat selection flag is "1", which indicates that the second segment can be restored by copying the data pattern 1. Accordingly, the third segment can be restored by copying the data pattern 1 respectively, and the fourth and the fifth segments can be restored by copying the data pattern 0 respectively. The sixth bit of the repeat flag is "0", which indicates that the sixth segment is not omitted and can be restored by extracting from the compressed data.

Such a compression uses both a repeat flag to record if a segment of data uses a data pattern and a repeat selection flag to record which data pattern is used by the segment of data. In addition, both pattern data and source data are applied respectively to record repeatable data patterns and non-repeated data in a source slice.

Figure 6:
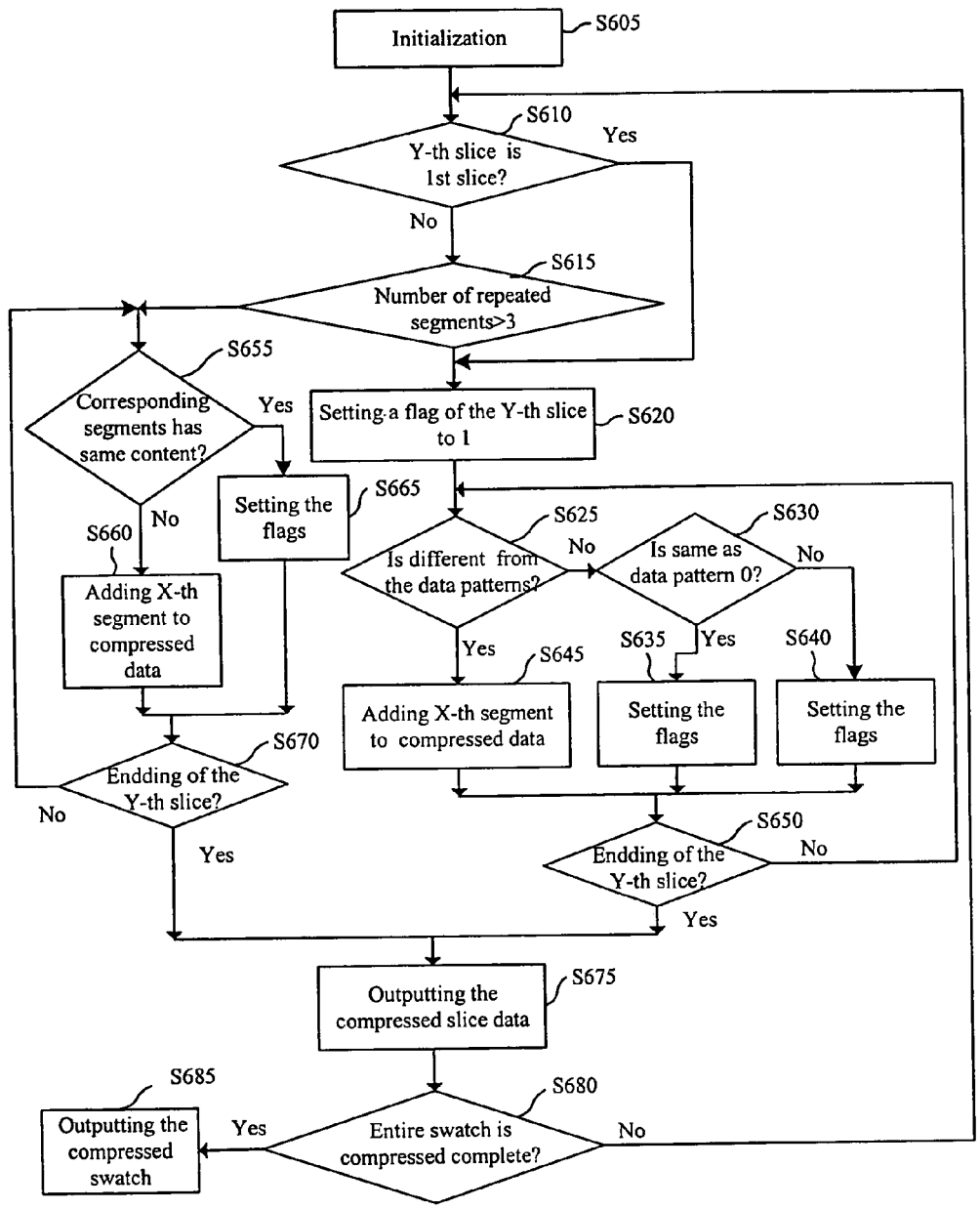
FIG. 6 is a flowchart of a further embodiment of a print data compressing method in accordance with the invention.

FIG. 6 is a flowchart of a further embodiment of a print data compressing method in accordance with the invention. As shown, this embodiment combines the two compressions methods described above. First, step S605 executes a compressing initialization to determine a slice number of a swatch and a nozzles number of an inkjet printer. Step S610 determines if Y-th slice of the swatch is the first slice; if yes, step S620 is executed; and if not, step S615 is executed.

Step S615 checks repeat numbers of segments and accordingly determines a compressing method for the Y-th slice; if the number of repeated segments is over a predetermined value, step S620 is executed; otherwise, step S655 is executed. In this case, the predetermined value is set to 3.

Step S620 sets a flag of the Y-th slice to 1, which indicates that a predetermined second compression is applied to the Y-th slice, and two segments having the highest two repeat numbers in the Y-th slice are selected as data pattern 0 and data pattern 1 respectively. Step S625 determines if I-th segment of the Y-tY-th h slice has different content from the data patterns 0 and 1; if yes, step S645 is executed; and if not, step S630 is executed. Step S645 sets a respective repeat flag to 0 and a respective repeat selection flag to 0 for the I-th segment, which indicates that the I-th segment is not compressed but is completely added to a respective compressed data.

Step S630 determines if the I-th segment has content the same as the data pattern 0; if yes, step S635 is executed; and if not, step S640 is executed. Step S635 sets the respective repeat flag to 1 and the respective repeat selection flag to 0 for the I-th segment, which indicates that the I-th segment is omitted due to its content identical to the data pattern 0. Step S640 sets the respective repeat flag to 1 and the respective repeat selection flag to 1 for the I-th segment, which indicates that the I-th segment is omitted due to its content identical to the data pattern 1. Step S650 determines if all segments of the Y-th slice are processed completely; if not, step S625 is executed; and if yes, step S675 is executed.

Alternately, step S655 sets the flag of the Y-th slice to 0, which indicates that a predetermined first compression is applied to the Y-th slice, and determines if I-th segments of the Y-th and the (Y−1)-th slices has identical contents; if yes, step S665 is executed; and if not, step S660 is executed. Step S665 sets the respective repeat flag to 1, which indicates that the I-th segment of the Y-th slice has a content the same as the I-th segment of the (Y−1)-th slice, thus the I-th segment of the Y-th slice is omitted. Step S660 sets the respective repeat flag to 0, which indicates that the I-th segment of the Y-th slice has a content different from the I-th segment of the (Y−1)-th slice, thus the I-th segment of the Y-th slice is not compressed but is completely added in a compressed data for the Y-th slice. Step S670 determines if all segments of the Y-th slice are processed completely; if not, step S655 is executed; and if yes, step S675 is executed.

Step S675 stores the Y-th slice for next slice to use and outputs the compressed data for the Y-th slice. Step S680 determines if entire swatch is compressed complete to thus obtain a compressed swatch of data; if yes, step S685 is executed; and if not, step S610 is executed. Step S685 outputs the compressed swatch of data for the entire swatch.

Figure 7:
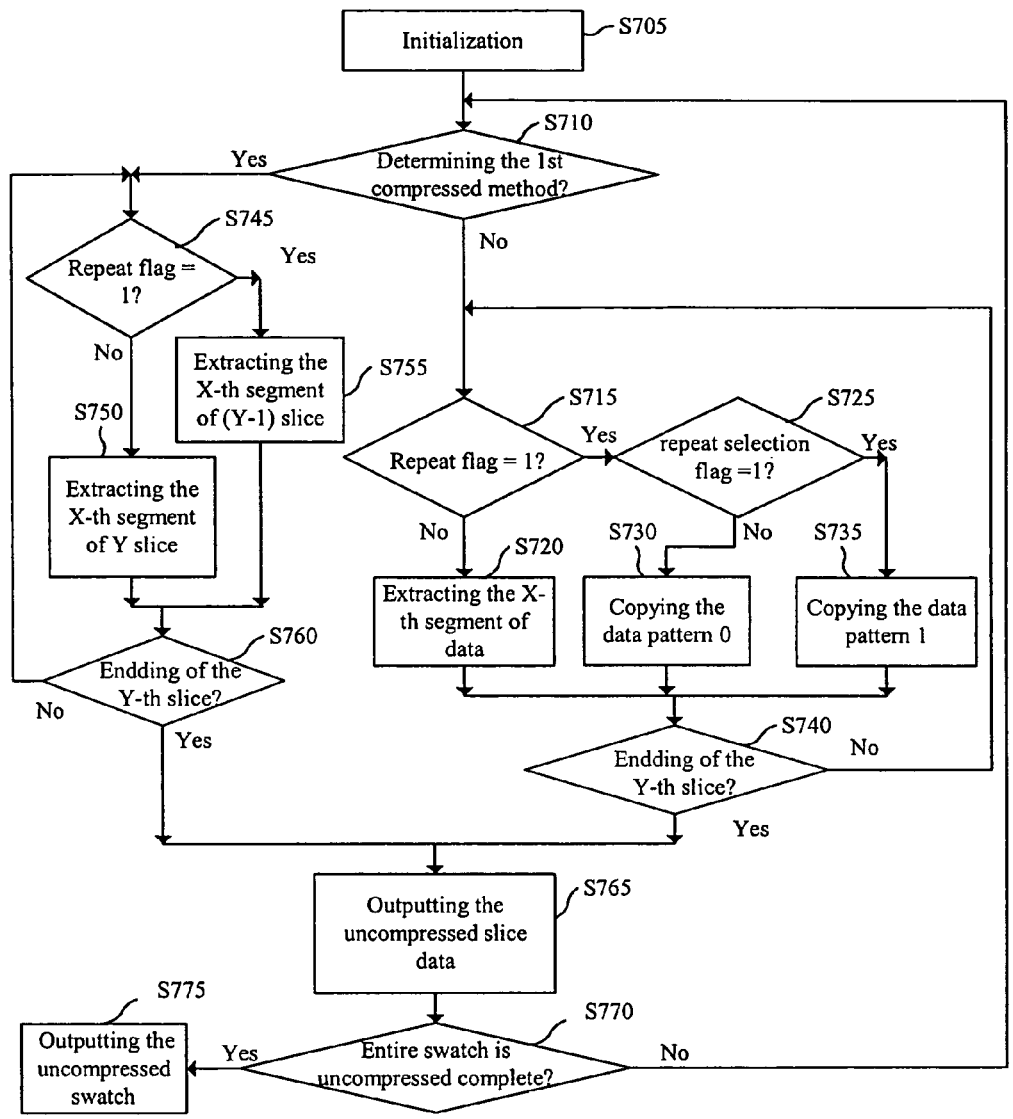
FIG. 7 is a flowchart of a print data decompressing method in accordance with the invention.

FIG. 7 is a flowchart of a print data decompressing method in accordance with the invention. Step S705 executes a decompressing initialization to find both a slice number of a swatch and a nozzle number of an inkjet printer in accordance with a head of each compressed swatch of data. Step S710 finds a compressing method used in a Y-th slice of the swatch by checking its flag; if the flag is set to 1, it indicates that a predetermined second compression is used in the Y-th slice and step S715 is executed; and if the flag is set to 0, it indicates that a predetermined first compression is used in the Y-th slice and step S745 is executed.

Step S715 determines if a repeat flag corresponding to an I-th segment of the Y-th slice is 1; if yes, step S725 is executed; and if not, step S720 is executed. Step S720 extracts the I-th segment of data completely from the compressed swatch of data because the I-th segment of data is not compressed in this case. Step S725 determines if a repeat selection flag corresponding to the I-th segment of the Y-th slice is 1; if not, step S730 is executed; and if yes, step S735 is executed. Step S730 copies the data pattern 0 as the I-th segment of data because the repeat selection flag as 0 indicates that the I-th segment is identical to the data pattern 0. Step S735 copies the data pattern 1 as the I-th segment of data because the repeat selection flag as 1 indicates that the I-th segment is identical to the data pattern 1. Step S740 determines if all segments of the Y-th slice are processed completely; if not, S715 is executed; and if yes, S765 is executed.

Step S745 determines if the repeat flag corresponding to the I-th segment of the Y-th slice is 1; if yes, step S755 is executed; and if not, step S750 is executed. Step S750 extracts the I-th segment of data completely from the compressed swatch of data because the repeat flag as 0 indicates that the I-th segment of the Y-th slice is different from that of the (Y−1)-th slice and thus not compressed. Step S755 extracts the I-th segment of the (Y−1)-th slice as the I-th segment of the Y-th slice from the compressed swatch of data because the repeat flag as 1 indicates that the I-th segment is identical in the two slices. Step S760 determines if all segments of the Y-th slice are processed completely; if not, S745 is executed; and if yes, S765 is executed.

Step S765 saves the Y-th slice for next slice to use and outputs a decompressed data for the Y-th slice. Step S770 determines if entire swatch is decompressed completely; if yes, step S775 is executed; and if not, step S710 is executed. Step S775 outputs a decompressed swatch of data for the entire swatch.

In view of the foregoing, it is known that the invention only records differences between a (x+1)-th slice and a x-th slice on a basis of the x-th slice, thereby achieving inter-slice data compression, or applies a repeat flag and a repeat selection flag for recording if a segment of data uses a data pattern, thereby achieving intra-slice data compression. Therefore, the invention can overcome the prior problems that only a segment of data as "00000000" can be compressed and a slice can apply only a single data pattern to compression in a successive arrangement.

Although the present invention has been explained in relation to its preferred embodiment, it is to be understood that many other possible modifications and variations can be made without departing from the spirit and scope of the invention as hereinafter claimed.

What is claimed is:

1. A print data compressing method, comprising the steps:
   a slicing step, which divides each swatch of data to be printed into plural slices of data, each slice having m bits to represent printed pixels and being divided into n segments of data, where m, n are integers;
   a compressing step, which uses an inter-slice compression to represent a (x+1)-th slice of data on a basis of a x-th slice of data for generating a compressed (x+1)-th slice of data and a (x+1)-th control character; and
   a decompressing step, which uses an inter-slice decompression with respect to the inter-slice compression to thus restore the (x+1)-th slice of data from the compressed (x+1)-th slice of data for further printing.

2. The method as claimed in claim 1, wherein the compressing step further includes the step:

a (x+1)-th control character generating step, which uses a (x+1)-th control character with n-bit to set its j-th bit to 1 when an j-th segment of the (x+1)-th slice is identical to that of the x-th slice; otherwise, to 0.

3. The method as claimed in claim 2, wherein the compressing step further includes the step:

a (x+1)-th compressed slice generating step, which omits the j-th segment of the (x+1)-th slice when the j-th bit of the (x+1)-th control character is set to 1 and conversely adds the j-th segment of the (x+1)-th slice to the compressed (x+1)-th slice of data.

4. The method as claimed in claim 3, wherein the control character further includes a field to indicate that the inter-slice data compression is applied for compressing and thus generating the compressed (x+1)-th slice of data.

5. The method as claimed in claim 1, wherein m indicates nozzle number of a printhead.

6. The method as claimed in claim 5, wherein a segment has 8M bits, where M is a positive integer.

7. A print data compressing method, wherein an j-th segment of a slice is represented by one of pre-stored k segments of data patterns, the method comprising the steps:

a slicing step, which divides each swatch of data to be printed into plural slices of data, each slice having m bits to represent printed pixels and being divided into n segments, where m, n are integers;

a compressing step, which uses an intra-slice compression to represent data of an j-th segment of a x-th slice by an k-th segment of data pattern for generating a compressed x-th slice of data and a x-th control character; and a decompressing step, which uses an intra-slice decompression with respect to the intra-slice compression to restore the x-th slice of data from the compressed x-th slice of data for further printing.

8. The method as claimed in claim 7, wherein the compressing step further includes the step:

a x-th control character generating step, which generates a x-th control character containing two fields of a repeat flag and a repeat selection flag, where the repeat flag has n bits and the repeat selection flag has n sub-fields, thereby setting an j-th bit of the repeat flag to 1 and an j-th sub-field of the repeat selection flag to k when the j-th segment of the x-th slice is identical to the k-th segment of data pattern; otherwise, both to 0, and further the repeat selection flag is not referred when the repeat flag has a value of 0.

9. The method as claimed in claim 7, wherein the compressing step further includes the step:

a x-th compressed slice generating step, which omits the j-th segment of the x-th slice when the j-th bit of the repeat flag of the x-th control character is set to 1 and conversely adds the j-th segment of the x-th slice to the compressed x-th slice of data.

10. The method as claimed in claim 9, wherein the control character further includes a pattern field to record the k-th segments of data patterns.

11. The method as claimed in claim 9, wherein the control character further includes a field to indicate that the intra-slice data compression is applied for compressing and thus generating the compressed x-th slice of data.

12. The method as claimed in claim 7, wherein m indicates nozzle number of a printhead.

13. The method as claimed in claim 7, wherein a segment has 8M bits, where M is a positive integer.

\* \* \* \* \*